(12) United States Patent
Kim et al.

(10) Patent No.: US 7,382,802 B2
(45) Date of Patent: Jun. 3, 2008

(54) DEVICE FOR SUPPORTING NICS AND TOES UNDER SAME PROTOCOL FAMILY OF SOCKET INTERFACE USING IP CHECKING MECHANISM

(75) Inventors: Chei-Yol Kim, Daejeon (KR); Sung-Hoon Son, Seoul (KR); Eun-Ji Lim, Daejeon (KR); Sung-In Jung, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 618 days.

(21) Appl. No.: 11/015,477

(22) Filed: Dec. 20, 2004

(65) Prior Publication Data

US 2005/0152361 A1 Jul. 14, 2005

(30) Foreign Application Priority Data

Dec. 23, 2003 (KR) .................. 10-2003-0095649

(51) Int. Cl.
  *H04J 3/16* (2006.01)
  *H04J 3/22* (2006.01)
(52) U.S. Cl. .................. 370/469; 709/228; 709/230
(58) Field of Classification Search ............ 370/464, 370/465, 469; 709/230, 228
See application file for complete search history.

(56) References Cited

U.S. PATENT DOCUMENTS

| 2004/0249957 | A1* | 12/2004 | Ekis et al. | ............... 709/228 |
| 2005/0021680 | A1* | 1/2005 | Ekis et al. | ............... 709/219 |
| 2005/0055510 | A1* | 3/2005 | Hass et al. | ............... 711/133 |
| 2005/0135415 | A1* | 6/2005 | Fan et al. | ............... 370/468 |

\* cited by examiner

*Primary Examiner*—Ajit Patel
(74) *Attorney, Agent, or Firm*—Lowe Hauptman Ham & Berner LLP

(57) ABSTRACT

The present invention propose a new mechanism, IP check layer which enables to use TOE cards and legacy NICs simultaneously within same protocol family in a Linux or a UNIX computing environment. The IP check layer is inserted between a BSD socket layer and an INET socket layer. IP check layer maintains a routing information and, information of IP addresses of each network interfaces and each socket's bind state. Using this information, IP check layer determines how to process a socket call and which layer (TOE layer, host INET layer) will take over the socket call. By means of the above mechanism, the present invention makes existing socket applications to use TOE cards and legacy NICs at the same time without modification or recompiling.

20 Claims, 11 Drawing Sheets

Prior Art

DEVICE FOR SUPPORTING NICS AND TOES UNDER SAME PROTOCOL FAMILY OF SOCKET INTERFACE USING IP CHECKING MECHANISM

BACKGROUND OF THE INVENITON

1. Field of the Invention

The present invention relates to a device for classifying a protocol family by using an IP in a TOE socket interface, and more particularly, to a protocol family classifying device using IP in a TOE socket interface for supporting both of a TOE card and a NIC in a Linux or a UNIX computing environment.

2. Description of the Related Art

FIG. 1 is a diagram illustrating a network software layer architecture in a Linux environment for using a conventional TCP offload engine (TOE).

As shown in FIG. 1, generally, there has been no single socket interface provided for supporting both of a TCP offload engine (TOE) card and conventional network interface cards (NICs) in a UNIX or a Linux computing environment. Therefore, in order to provide a socket interface of TOE, a specific TOE application programming interface (API) 10 must be installed or a TOE protocol family 11 must be additionally implemented in a network module of the UNIX or the Linux.

However, a device using the API 10 or the TOE protocol family 11 for providing the socket interface of the TOE must be used by modifying application programs and re-compiling the modified application programs.

Meanwhile, an Ethernet communication technique includes additional functions for reducing and recovering errors generated during communication because the Ethernet communication technique is developed for long distance communication. However, the additional functions may degrade a communication performance in a system level network such as a cluster. Therefore, virtual interface architecture (VIA) for a system area network (SAN) has been introduced as a network protocol. The VIA does not includes additional functions for reducing and recovering errors but it guarantees fast communication.

However, the VIA does not provide the socket interface.

Accordingly, there have been various studies in progress for using the socket interface in the system level network protocol and representative one of studies is a socket over VIA (SOVIA) using a socket interface in the VIA.

However, the SOVIA provides the socket interface on a predetermined protocol.

SUMMARY OF THE INVENTION

Accordingly, the present invention is directed to a protocol family classifying device using an IP in a TOE socket interface for supporting both of a TOE card and a NIC, which substantially obviates one or more problems due to limitations and disadvantages of the related art.

It is an object of the present invention to provide a protocol family classifying device using an IP in a TOE socket interface for supporting both of a TOE card and a NIC in a network environment such as TCP/IP and UDP by classifying a socket call of TCP/IP layer and a socket call of TOE network layer and transferring classified socket call to corresponding layer by using an IP address.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a device for classifying a protocol family by using IP in a socket interface supporting a TOE, wherein an IP Check layer is inserted between a BSD (Berkeley Software Distribution) socket and an INET socket, the IP Check layer maintains a routing information and an IP information of network interfaces in lower layer and the device classifies and processes socket calls according to IP address of each socket calls.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
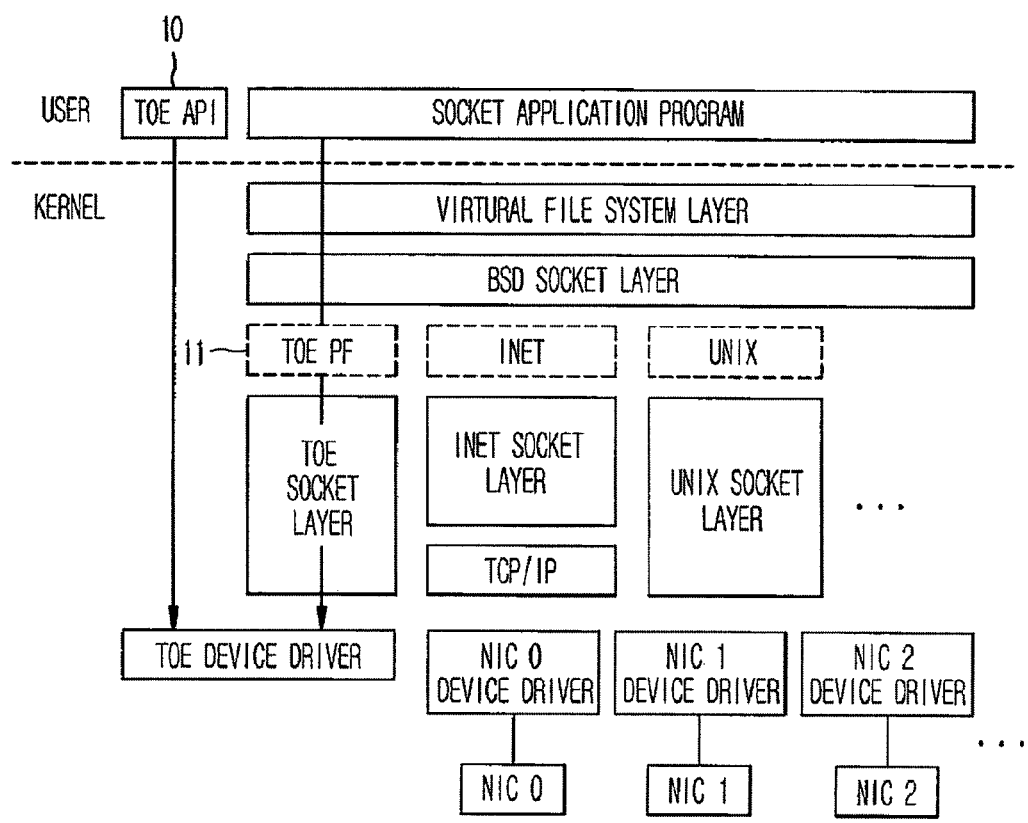
FIG. 1 is a diagram illustrating a network software layer architecture in a Linux environment for using a conventional TCP offload engine (TOE)
Figure 2:
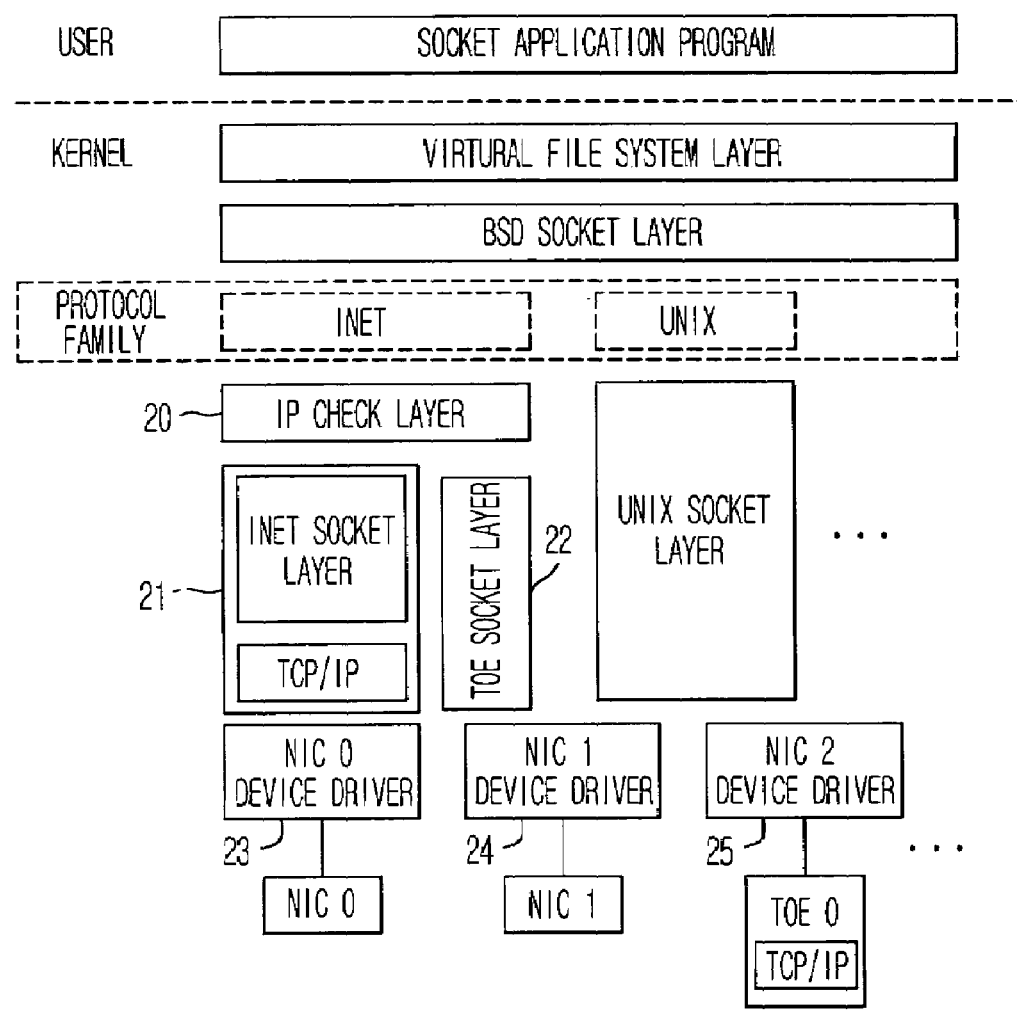
FIG. 2 is a diagram illustrating a TOE socket software layer architecture including an IP CHECK layer in accordance with a preferred embodiment of the present invention.

FIG. 2 is a diagram illustrating a TOE socket software layer architecture including an IP CHECK layer in accordance with a preferred embodiment of the present invention.

An internet protocol (IP) address is allocated to each of network interface cards for classifying a transmission control protocol/internet protocol (TCP/IP) layer 21 and a TCP offload engine (TOE) layer 22 under a socket layer in the present invention.

As shown in FIG. 2, network interface card (NIC) drivers 23 and 24 are connected to the TCP/IP layer 21 as a lower layer and a TCP offload engine (TOE) card driver 25 is connected to a TOE layer 22 as a lower layer.

Generally, a unique IP address is assigned to each of the network interface cards and parameters of each socket are transferred to a layer including a network interface card having corresponding IP address. For transferring the parameters to corresponding IP address in the present invention, a routing table is maintained in the IP check layer 20 and the routing table includes information of network address of each network interface card and information of routing.

Meanwhile, the UNIX and the Linux provides various socket commands such as BIND, LISTEN, ACCEPT, SENDMSAG, RECVMSAG, GETNAME, IOCTL, POLL, SHUTDOWN, GETWOCKOPT and SETSOCKOPT.

The protocol family classifying device of the present invention determines a layer to transfer a call from the IP check layer based on each socket call. Hereinafter, the device of the present invention is explained by referring to FIGS. 3 to 22.

1. BIND

Figure 3:
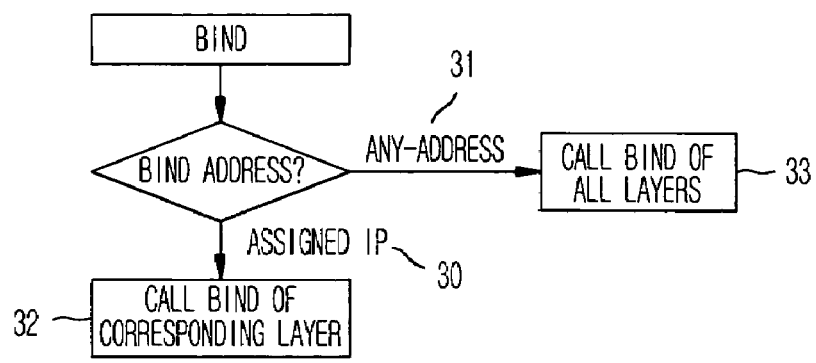
FIG. 3 is a flowchart illustrating a procedure for processing BIND call in an IP check layer 20 in accordance with a preferred embodiment of the present invention.

FIG. 3 is a flowchart illustrating a procedure for processing BIND call in an IP check layer 20 in accordance with a preferred embodiment of the present invention.

The BIND allocates a local IP address and a port number to a local host in a TCP/IP connection. The local host and a remote host are connected in the TCP/IP connection.

It is possible to allocate the local IP address by using one of an assigned IP address in lower layer or ANY_ADDRESS. The assigned IP address is one of IP addresses assigned to registered network interface cards and the ANY_ADDRESS means IP address will be assigned thereafter.

As shown in FIG. 3, the IP check layer 20 transfers a call to a lower layer including the assigned IP address at step 32 in case of the assigned IP address 30

In contrary, in case of the ANY_ADDRESS, the BIND call is transferred to both of two layers at step 33. That is, allocation of IP address is delayed until the IP address is decided to one of the assigned IP address.

Also, when the port number is specified by a user, the specified port number is checked whether the specified port number is currently used. If the specified port number is not currently used, the specified port number is assigned and if not, an error message is returned to the user. If the user specifies the port number as "0", one of un-used port numbers is automatically assigned.

2. LISTEN

Figure 4:
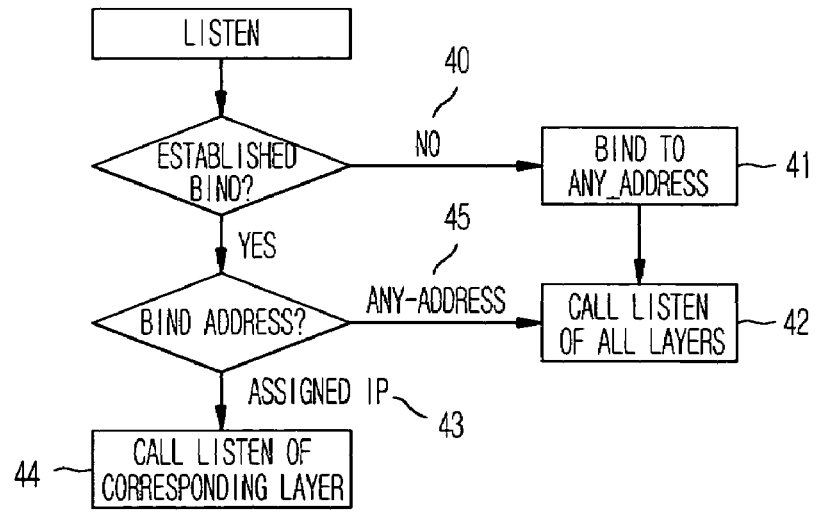
FIG. 4 is a flowchart showing a procedure for processing a LISTEN call in the IP CHECK layer 20 in accordance with a preferred embodiment of the present invention.

FIG. 4 is a flowchart showing a procedure for processing a LISTEN call in the IP CHECK layer 20 in accordance with a preferred embodiment of the present invention.

The LISTEN elucidates to accept a request of connection to a socket where a connection is not established at a TCP server side.

Generally, the LISTEN is called after the BIND call. However, if the LISTEN is called before the BIND (40), the bind is established by using the ANY_ADDRESS and the port number is allocated at step 41. After allocating the port number, the LISTEN is called at step 42.

The LISTEN routes the call to a layer having the assigned IP when the local IP address is allocated to the assigned IP (43) at step 44. If the local IP address is bind to the ANY_ADDRESS (45), calls of both layers are called at step 42

3. ACCEPT

Figure 5:
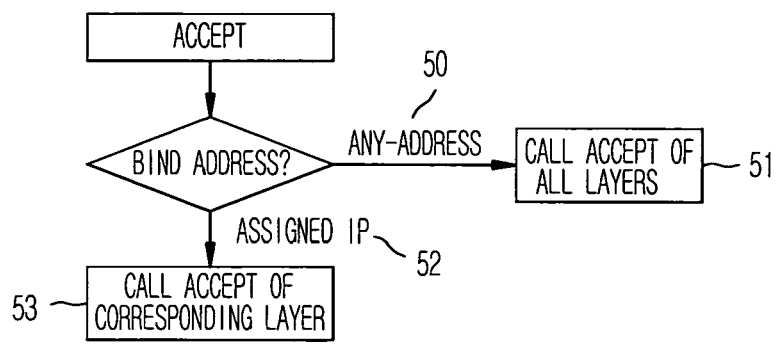
FIG. 5 is a flowchart showing a procedure for calling ACCEPT in the IP CHECK layer 20 in accordance with a preferred embodiment of the present invention.

FIG. 5 is a flowchart showing a procedure for processing ACCEPT call in the IP CHECK layer 20 in accordance with a preferred embodiment of the present invention.

The ACCEPT is called from a server side in the TCP connection and establishes a new connection by selecting one of connection requests in an accept queue. Also, the ACCEPT is not provided in a user datagram protocol (UDP) where the connection is not provided. Also, it is possible to call the ACCEPT only when the BIND is established.

Referring to FIG. 5, if BIND is established to ANY_ADDRESS (50), ACCEPT of all layers are called at step 51. If the BIND is established to the assigned IP address (52), the ACCEPT of corresponding layer having the assigned IP address is called at step 53.

When the ACCEPT is performed in a BLOCK mode, a kernel may be blocked at a predetermined layer. Therefore, it has to avoid that the calling of ACCEPT is blocked and stopped at a stack for orderly performing the ACCEPT call in multiple layers when simultaneously performing the ACCEPT call in the multiple layers.

4. CONNECT

Figure 6:
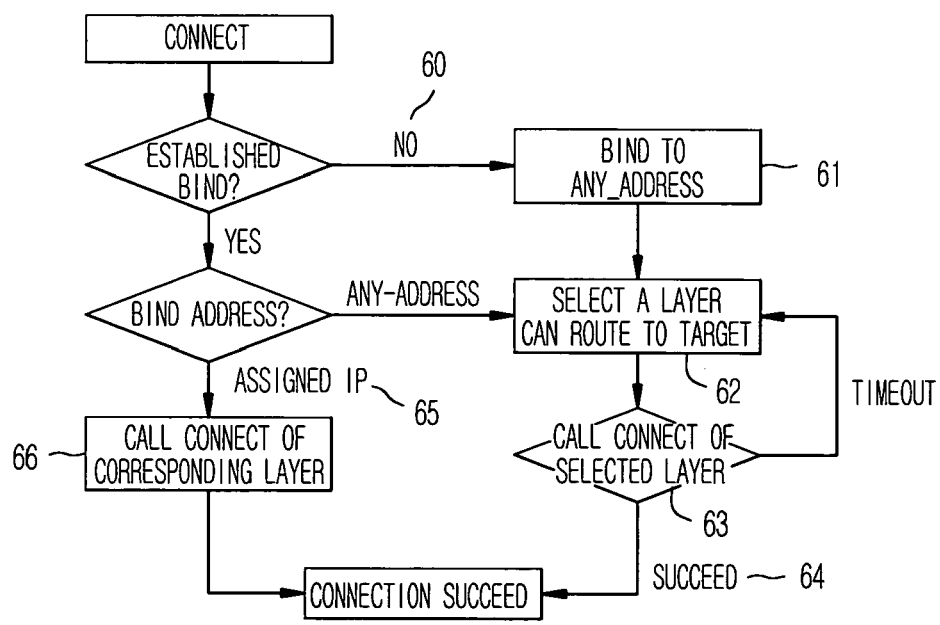
FIG. 6 is a flowchart illustrating a procedure for processing a CONNECT call in the IP CHECK layer 20 in accordance with a preferred embodiment of the present invention.

FIG. 6 is a flowchart illustrating a procedure for processing a CONNECT call in the IP CHECK layer 20 in accordance with a preferred embodiment of the present invention.

The CONNECT generates an activated socket connection by requesting a connection to a socket at the server side which is in waiting after LISTEN in case of the TCP. In case of the UDP, the CONNECT assigns an address of target place when SEND is called. The CONNECT also determines a stack to perform the CONNECT according to a state of BIND.

As shown in FIG. 6, if BIND is not established 60, the BIND is established to ANY_ADDRESS at step 61 and orderly performs the CONNECT to all stacks 62 where can route to the address of target calling the CONNECT at step 63 until it finds a stack where a connection can be established to the target address (64).

In contrary, if the BIND is established to the assigned IP address (65), it calls the CONNECT of a layer having the assigned IP address at step 66.

Also, the first stack among stacks calling CONNECT is selected in case of the UDP because connections are not established in the UDP.

SENDMSG

Figure 7:
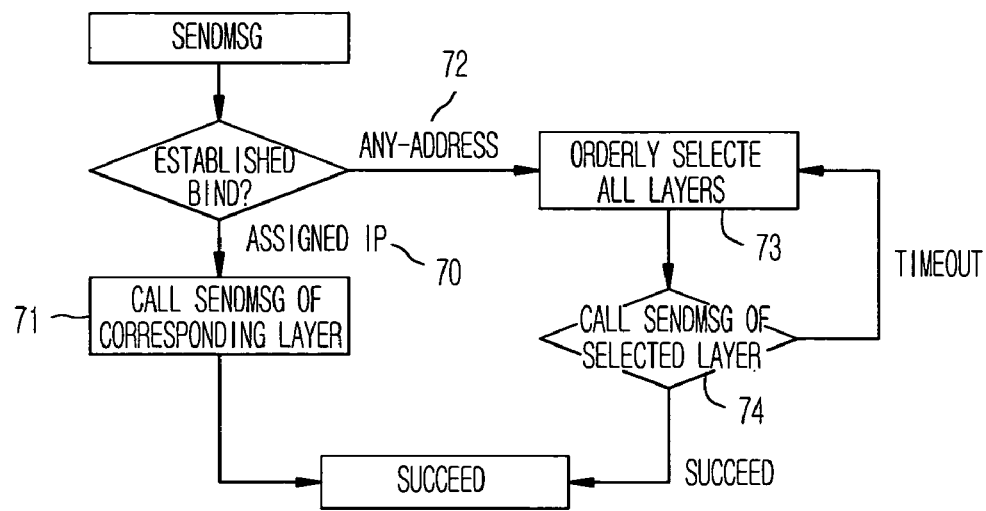
FIG. 7 is a flowchart showing a procedure for processing SENDMSG call in the IP CHECK layer 20 in accordance with a preferred embodiment of the present invention.

FIG. 7 is a flowchart showing a procedure for processing SENDMSG call in the IP CHECK layer 20 in accordance with a preferred embodiment of the present invention.

The SENDMSG is used for sending data to a socket and it can be used both of cases that a connection is established or not established.

As shown in FIG. 7, the SENDMSG analyzes a current state of BIND and SENDMSG is transferred at step 71 when BIND is established to the assigned IP address (70). If the BIND is established to ANY_ADDRESS (72), a port number is allocated at first and orderly transfers SENDMSG to all layers (73) at step 74.

RECVMSG

Figure 8:
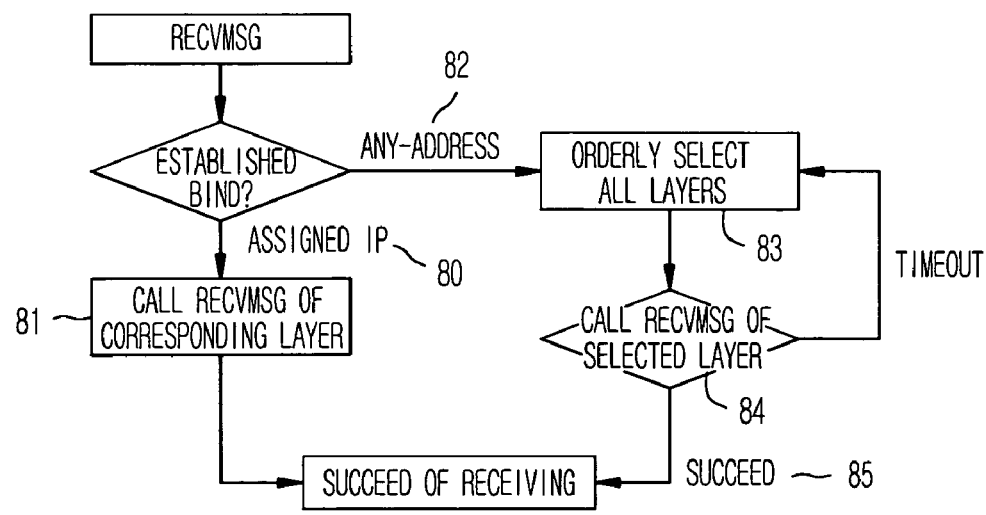
FIG. 8 is a flowchart showing a procedure for processing RECVMSG in the IP CHECK layer 20 in accordance with a preferred embodiment of the present invention.

FIG. 8 is a flowchart showing a procedure for processing RECVMSG in the IP CHECK layer 20 in accordance with a preferred embodiment of the present invention.

The RECVMSG is used for receiving data in a socket.

As shown in FIG. 8, if the BIND is established to the assigned IP address (80), the RECVMSG is transferred to corresponding layer at step 81.

In contrary, the BIND is established to the ANY_ADDRESS (82), a call of RECVMSG is differently processed according to a block mode or a non-block mode. That is, in case of non-block mode, the RECVMSG is orderly requested to all layers at step 83. In case of block mode, the RECVMSG is requested to all layers by setting a time out not to be blocked at a specific layer. If there is a layer successfully requested, the RECVMSG process is stopped at step 85.

7. GETNAME

Figure 9:
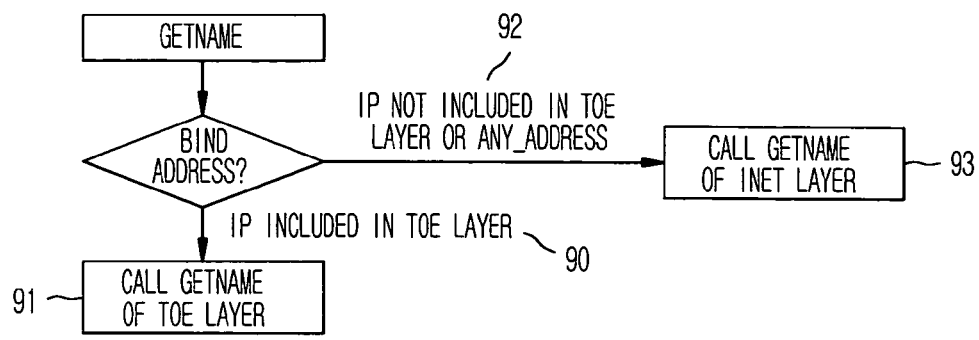
FIG. 9 is a flowchart showing a procedure for processing GETNAME in the IP CHECK layer 20 in accordance with a preferred embodiment of the present invention.

FIG. 9 is a flowchart showing a procedure for processing GETNAME in the IP CHECK layer 20 in accordance with a preferred embodiment of the present invention.

The GETNAME returns a source of a socket, or an address of target. The address includes an IP and a port number.

As shown in FIG. 9, if the BIND is established to IP included in TOE layer 22, the GETNAME transfers a request to the TOE layer at step 92. If not (92), the request of GETNAME is transferred to the host INET socket layer 21.

8. POLL

Figure 10:
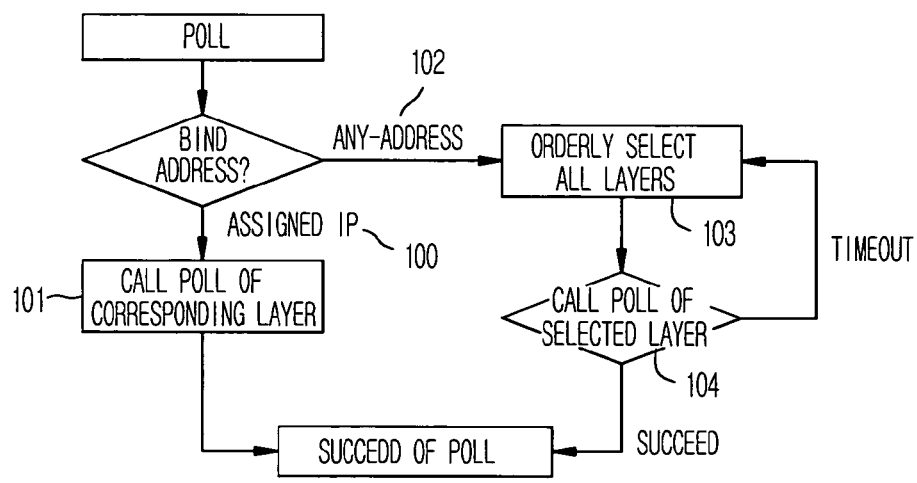
FIG. 10 is a flowchart showing a procedure for processing POLL call in the IP CHECK layer 20 in accordance with a preferred embodiment of the present invention.

FIG. 10 is a flowchart showing a procedure for processing POLL call in the IP CHECK layer 20 in accordance with a preferred embodiment of the present invention.

The POLL is used for waiting an event occurred in a file descriptor.

As shown in FIG. 10, if the BIND is set to the assigned IP at step 100, the POLL transfers the call to a layer having the assigned IP address at step 101. If the BIND is set to ANY_ADDRESS 102, the POLL is performed for all layers at step 104.

9. SHUTDOWN

Figure 11:
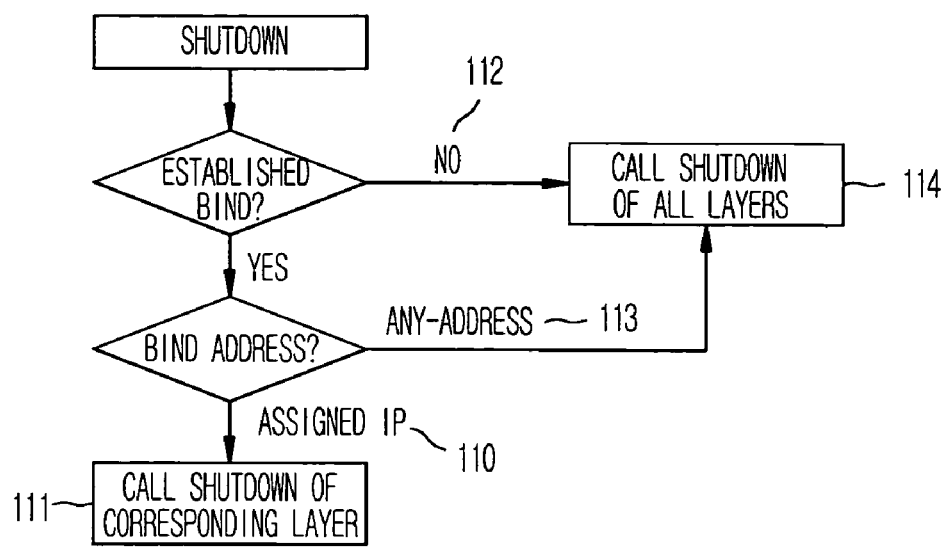
FIG. 11 is a flowchart showing a procedure for processing SHUTDOWN in the IP CHECK layer 20 in accordance with a preferred embodiment of the present invention.

FIG. 11 is a flowchart showing a procedure for processing SHUTDOWN in the IP CHECK layer 20 in accordance with a preferred embodiment of the present invention.

The SHUTDOWN terminates one of ends in a bidirectional connection.

If BIND is established to the assigned address (110), the SHUTDOWN transfers a call to a layer having the assigned address at step 111. If the BIND is established to ANY_ADDRESS, the call is transferred to all layers at step 114.

10. SETSOCKOPT

Figure 12:
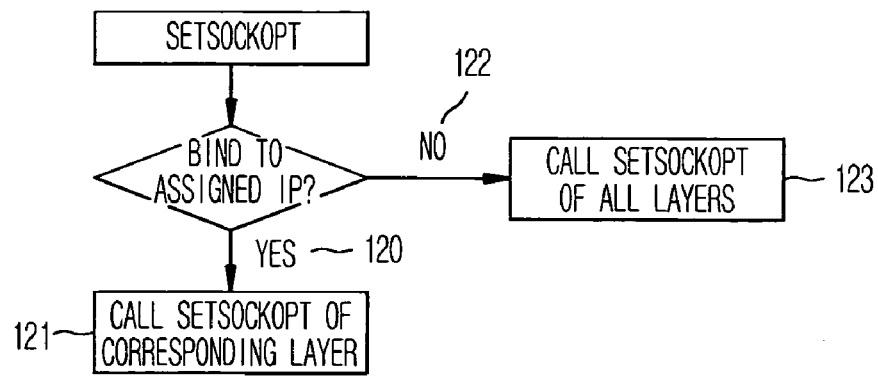
FIG. 12 is a flowchart showing a procedure for processing SETSOCKOPT in the IP CHECK layer in accordance with a preferred embodiment of the present invention.

FIG. 12 is a flowchart showing a procedure for processing SETSOCKOPT in the IP CHECK layer in accordance with a preferred embodiment of the present invention.

The SETSOCKOPT sets options of a socket.

As shown in FIG. 12, if the current socket is bound to the assigned IP at step 120, the SETSOCKOPT transfers a call to a layer including the assigned IP at step 121. If the socket is bound to ANY_ADDRESS at step 122, a call of SETSOCKOPT is transferred to all layers at step 123.

11. GETSOCKOPT

Figure 13:
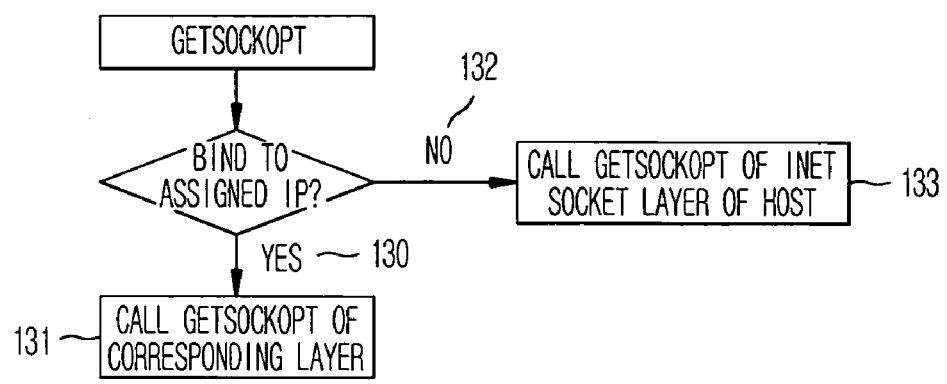
FIG. 13 is a flowchart showing a procedure for processing GETSOCKOPT in the IP CHECK layer 20 in accordance with a preferred embodiment of the present invention.

FIG. 13 is a flowchart showing a procedure for processing GETSOCKOPT in the IP CHECK layer 20 in accordance with a preferred embodiment of the present invention.

The GETSOCKOPT reads options of a current socket.

As shown in FIG. 13, if the current socket is bound to the assigned IP at step 130, the GETSOCKOPT transfers the call to the layer having the assigned IP at step 131. If the current socket is bound to ANY_ADDRESS (132), the call of GETSOCKOPT is transferred to the INET socket layer 210 of the host at step 133. It is because the INET socket layer 21 of the host takes charge of the socket options in both cases of the current socket bound to the ANY_ADDRESS.

12. RELEASE

Figure 14:
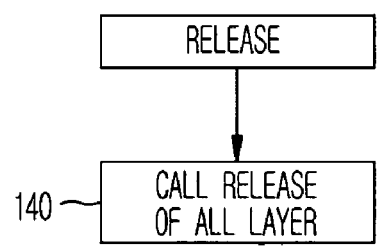
FIG. 14 is a flowchart showing a procedure for processing a RELEASE in the IP CHECK layer in accordance with a preferred embodiment of the present invention.

FIG. 14 is a flowchart showing a procedure for processing a RELEASE in the IP CHECK layer in accordance with a preferred embodiment of the present invention.

The RELEASE closes a socket. Because the RELEASE closes and releases operations and data related to corresponding sockets in all layer, the RELEASE is transferred to all layers.

13. IOCTL

IOCTL performs various operations including setting of a network device. Accordingly, the IOCTL performs different operations according to a command provided from a CMD which transfers variables. Therefore, the IOCTL also performs different operations in IP CHECK layer 20 according to each command provided from the CMD.

Hereinafter, the IOCTL is explained according to a command group which is processed by identical process in the IP CHECK layer.

GROUP 1: FIOSETOWN, SIOCSPGRP

Figure 15:
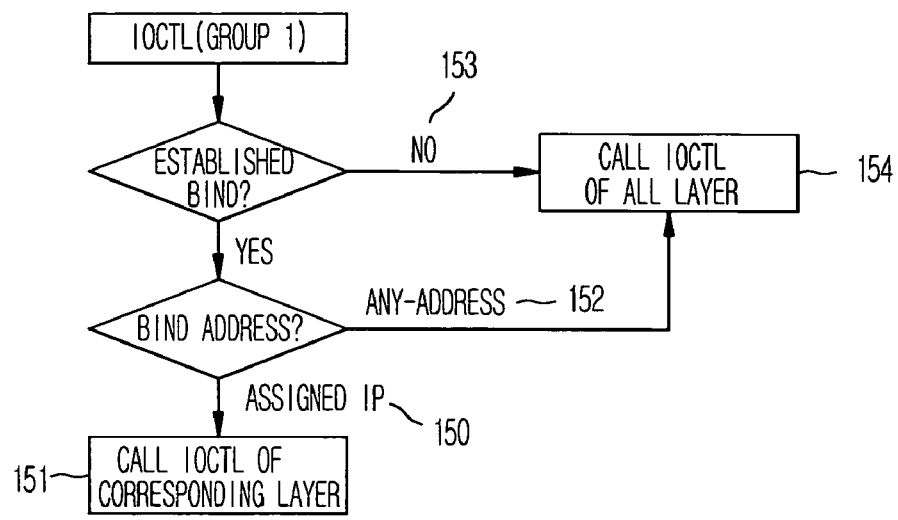
FIG. 15 is a flowchart showing a procedure for processing GROUP 1 of IOCTL in the IP CHECK layer in accordance with a preferred embodiment of the present invention.

FIG. 15 is a flowchart showing a procedure for processing GROUP 1 of IOCTL in the IP CHECK layer in accordance with a preferred embodiment of the present invention.

The GROUP 1 of CMD stores a process group ID or a process ID using the socket calling the IOCTL in the socket. A layer having data structure storing the process ID or the process group ID is the INET socket layer. Accordingly, if the socket calling the IOCTL is bound to the assigned IP address at step 150, a request of IOCTL is transferred to corresponding layer at step 151. If it is bound to ANY_ADDRESS (152) or not bound (153), the request of IOCTL is transferred to all layers at step 154.

GROUP 2: FIOGETOWN, SIOCGPGRP

Figure 16:
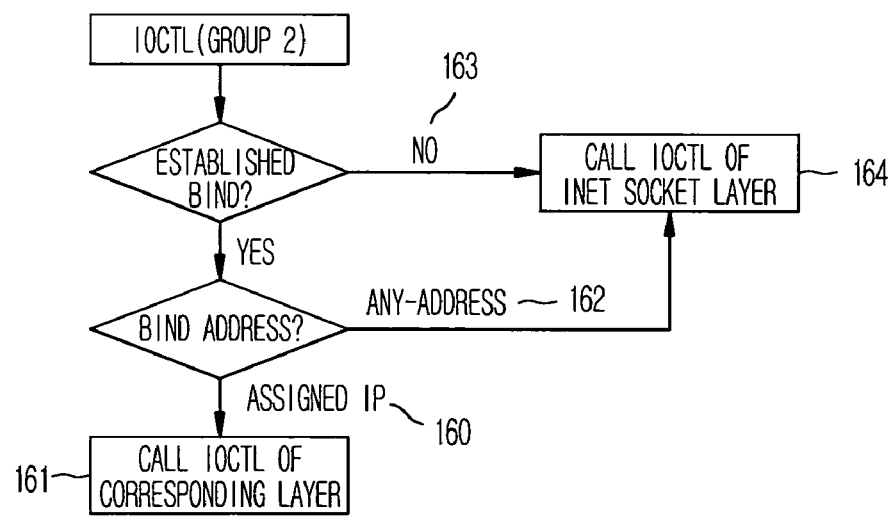
FIG. 16 is a flowchart showing a procedure for processing commands in GROUP 2 of IOCTL in the IP CHECK layer 20 in a preferred embodiment of the present invention.

FIG. 16 is a flowchart showing a procedure for processing commands in GROUP 2 of IOCTL in the IP CHECK layer 20 in a preferred embodiment of the present invention.

The commands in GROUP 2 return a process ID or a process group ID stored in a socket to a user.

As shown in FIG. 16, if a corresponding socket is bound to the assigned IP address (160), a request of IOCTL is transferred to the corresponding layer at step 161. If it is bound to ANY_ADDRESS (162), or is not bound yet (163), it is possible to transfer the request to any layers because the process ID and the process group ID are stored in both layers. In the preferred embodiment of the present invention, the request of IOCTL is transferred to the host INET socket layer at step 164.

GROUP 3: SIOCGSTAMP

Figure 17:
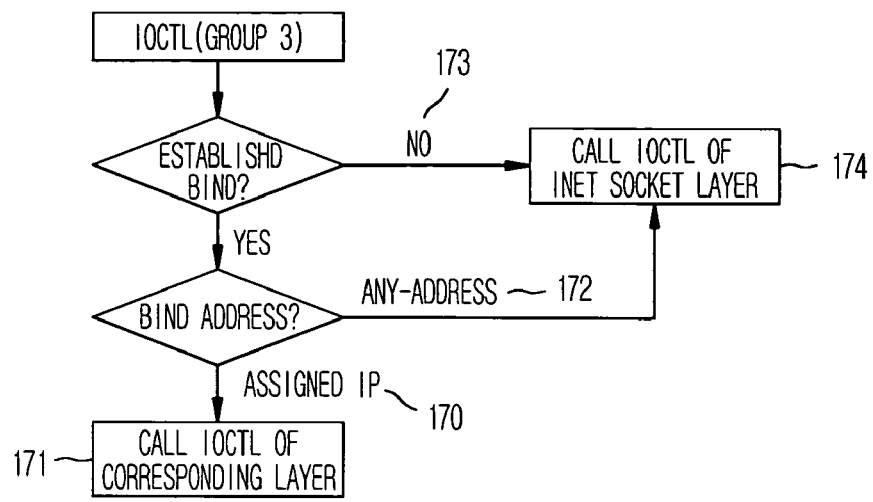
FIG. 17 is a flowchart showing a procedure for processing commands in GROUP 3 of IOCTL in the IP CHECK layer 20 in accordance with a preferred embodiment of the present invention.

FIG. 17 is a flowchart showing a procedure for processing commands in GROUP 3 of IOCTL in the IP CHECK layer 20 in accordance with a preferred embodiment of the present invention.

The commands in GROUP 3 transfers a time stored in a socket used by timeout functions in the socket to a user. If BIND is established to the assigned IP address (170), it is transferred to the layer having the assigned IP address at step 170. If the BIND is established to ANY_ADDRESS (172), or BIND is not established (173), it transfers to the host INET socket layer at step 174. The time is recorded in all layers in a case that BIND is not established or established to ANY_ADDRESS. Therefore, it does not a matter to transfer the request to any layers. In the preferred embodiment, it is transferred to the host INET socket layer for convenience.

GROUP 4: SIOCADDRT, SIOCDELRT, SIOCRTMSG

Figure 18:
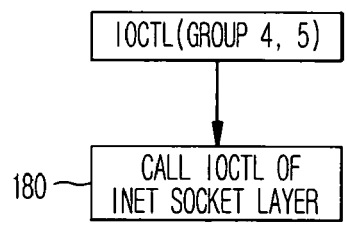
FIG. 18 is a flowchart showing a procedure for processing commands in GROUP 4-5 of IOCTL in the IP CHECK layer 20 in accordance with a preferred embodiment of the present invention.

FIG. 18 is a flowchart showing a procedure for processing commands in GROUP 4 of IOCTL in the IP CHECK layer 20 in accordance with a preferred embodiment of the present invention.

The commands in GROUP 4 add an entry or delete the entry in a routing table. The routing table is information required to be maintained in all layers. Therefore, all layers call the IOCTL of GROUP 4 without concerning the state of BIND at step 180.

GROUP 5: SIOCDARP, SIOCGARP, SIOCSARP

The commands in GROUP 5 are related to an address resolution protocol (ARP). Therefore, it is called at all layers at step 180.

GROUP 6: SIOCGIFADDR, SIOCGIFBRDADDR, SIOCGIFNETMASK

Figure 19:
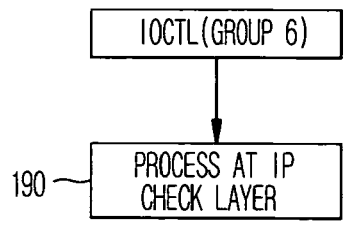
FIG. 19 is a flowchart showing a procedure for processing commands in GROUP 6 of IOCTL in the IP CHECK layer 20 in accordance with a preferred embodiment of the present invention.

FIG. 19 is a flowchart showing a procedure for processing commands in GROUP 6 of IOCTL in the IP CHECK layer 20 in accordance with a preferred embodiment of the present invention.

The commands in GROUP 6 transfers an IP address assigned by each command. The IP address includes an IP address of a network interface, a broadcasting address and a network mask address.

In the present invention, a routing information and IP addresses of the network interface cards must be managed in the IP CHECK layer 20. Accordingly, the request is not necessary to transfer to lower layer. The commands in GROUP 6 are processed in the IP CHECK layer 20 at step 190.

GROUP 7: SIOCSIFADDR, SIOCSIFBRDADDR, SIOCSIFNETMASK, SIOCSIFDSTADDR, SIOCSIFPFLAGS

Figure 20:
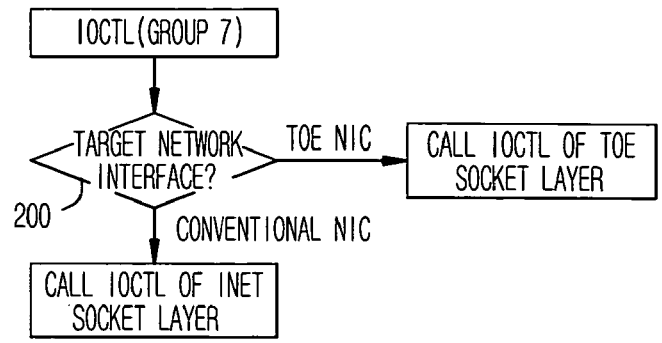
FIG. 20 is a flowchart showing a procedure for processing commands in GROUP 7 of IOCTL in the IP CHECK layer 20 in accordance with a preferred embodiment of the present invention.

FIG. 20 is a flowchart showing a procedure for processing commands in GROUP 7 of IOCTL in the IP CHECK layer 20 in accordance with a preferred embodiment of the present invention.

The commands in GROUP 7 assign and change each IP address or a flag. The user assigns a name of network interface as IOCTL variables and a layer having corresponding network interface is found in the IP CHECK layer 20 at step 200 and a call is transferred to corresponding layer.

GROUP 8: SIOCGIFBR, SIOCSIFBR, SIOCGIFVLAN, SIOCSIFVLAN

Figure 21:
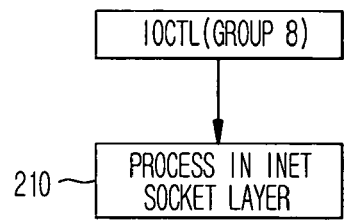
FIG. 21 is a flowchart showing a procedure for processing commands in GROUP 8 of IOCTL in the IP CHECK layer 20 in accordance with a preferred embodiment of the present invention.

FIG. 21 is a flowchart showing a procedure for processing commands in GROUP 8 of IOCTL in the IP CHECK layer 20 in accordance with a preferred embodiment of the present invention.

The commands in GROUP 8 are calls for predetermined kernel module and they are processed in the INET socket layer at step 210.

GROUP 9: SIOCGIFDIVERT, SIOCSIFDIVERT

Figure 22:
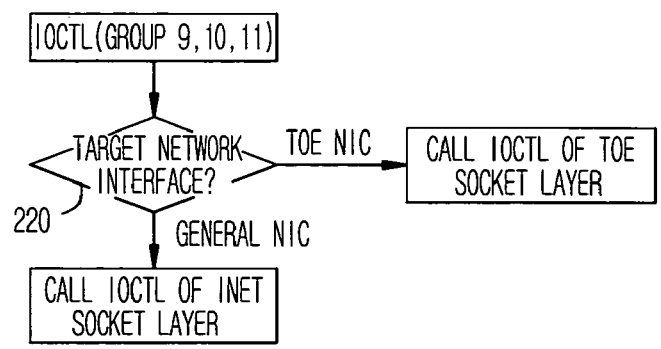
FIG. 22 is a flowchart showing a procedure for processing commands in GROUP 9-11 of IOCTL in the IP CHECK layer 20 in accordance with a preferred embodiment of the present invention.

FIG. 22 is a flowchart showing a procedure for processing commands in GROUP 9 of IOCTL in the IP CHECK layer 20 in accordance with a preferred embodiment of the present invention.

The commands in GROUP 9 are commands related to DIVERT. When the commands in GROUP 9 are called, a name of network interface is included in data transferred by a user where the network interface is a target network interface where the commands are performed. In the IP CHECK layer 20, it determines a layer where the IOCTL call is transferred to by using the name of network interface included in the data at step 220.

GROUP 10: SIOCADDDLCI, SIOCDELDLCI

The commands in GROUP 10 are commands for FRAME RELAY protocol. When calling the commands in GROUP 10, data transferred by a user also includes a name of network interface where the commands are performed. In the IP CHECK layer 20, it determines a layer where the IOCTL call is transferred to by using the name of network interface included in the data at step 220.

GROUP 11: DEFAULT

The commands in GROUP 11 include commands not included in the GROUPs 1 to 10. The commands in GROUP 11 are commands related to sub commands related to network device. When the DEFAULT is called, data also includes a name assigned for target network interface. In the IP CHECK layer 20, it determines a layer where the IOCTL call is transferred to by using the name of network interface included in the data at step 220.

The above mentioned present invention can be implemented as a set of computer executable instructions can be stored in a computer readable recording medium including a read only memory (ROM), a random access memory (RAM), a compact disk (CD)-ROM, a digital video disk (DVD)-ROM, a magnetic tape, a floppy disk and an optical disk. Also, the computer readable recording medium can be distributed to computer systems connected to a network and computer readable code can be stored and performed according to a distribution method.

As mentioned above, the protocol family classifying device using IP in accordance with the present invention provides a socket interface for using the TOE network card without modifying application programs of the conventional socket interface. Also, the present invention provides the socket interface that supports both of the TOE card and the NIC in same protocol family.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A device for classifying a protocol family by using IP in a socket interface supporting a TOE (TCP Offload Engine), wherein an IP Check layer is inserted between a BSD (Berkeley Software Distribution) socket and an INET socket, the IP Check layer maintains a routing information and an IP information of network interfaces in lower layer and the device classifies and processes socket calls in a kernel according to TCP/IP layer and a TOE layer which are lower layers of the INET socket.

2. The device of claim 1, wherein the device allocates an IP address to each network card and the IP Check layer classifies a socket call according to the TCP/IP layer and the TOE layer by using an IP address value.

3. The device of claim 1, wherein the IP Check layer processes BIND call by transferring a call to corresponding lower layer including an assigned IP address in case of a predetermined IP address; and the IP Check layer processes BIND call by transferring the call to all lower layer in case of ANY_ADDRESS.

4. The device of claim 1, wherein the IP Check layer processes LISTEN call by transferring the LISTEN call to corresponding lower layer including the assigned IP address when a predetermined IP is assigned; the IP Check layer processes LISTEN call by transferring the LISTEN call to all lower layers when BIND is established to ANY_ADDRESS; and the IP Check layer process the LISTEN call by establishing BIND to ANY_ADDRESS, allocating a port number and transferring the LISTEN call to all lower layers when the LISTEN call is called without calling the BIND call.

5. The device of claim 1, wherein the IP Check layer processes ACCEPT call by calling the ACCEPT to a lower layer including an assigned IP address when BIND is established to a predetermined IP; and the IP Check layer processes ACCEPT call by calling the ACCEPT call for all lower layer when BIND is established to ANY_ADDRESS.

6. The device of claim 1, wherein the IP Check layer processes CONNECT call by calling the CONNECT of a layer including an assigned IP when the BIND is established to a predetermined IP; the IP Check layer process the CONNECT call by the BIND is established to ANY_ADDRESS, orderly performing the CONNECT to all stacks which can route to target address calling the CONNECT and stopping when it finds a stack can establish a connection when the BIND is not established; and the IP Check layer process CONNECT call by establishing the first stack calling the CONNECT among stacks which can route in case of the UDP because UDP does not establish real connection.

7. The device of claim 1, wherein the IP Check layer processes SENDMSG call by transferring the SENDMSG to a corresponding layer when the BIND is established to a predetermined IP address; and the IP Check layer processes SENDMSG call by allocating a port and orderly calling the SENDMSG for all lower layers until it succeeds when the BIND is established to ANY_ADDRESS.

8. The device of claim 1, wherein the IP Check layer processes RECVMSG call by transferring the RECVMSG to a corresponding layer when the BIND is established to a predetermined IP address; and the IP Check layer processes RECVMSG call by determining whether a block mode of the RECVMSG call is set, transferring RECVMSG request to all layers in case of non-block mode and orderly requesting to all layers by setting a timeout for not occurring blocked at one layer and terminating operations until a succeed layer is occurred when the BIND is established to ANY_ADDRESS.

9. The device of claim 1, wherein the IP Check layer processes GETNAME call by transferring the GETNAME call to the TOE layer when the BIND is established to an IP included in the TOE layer; and the IP Check layer process GETNAME call by transferring the GETNAME call to the INET socket layer when the BIND is not established to an IP included in the TOE layer.

10. The device of claim 1, wherein the IP Check layer processes POLL call by transferring a call to a layer having the assigned IP when BIND is established to a predetermined IP; and the IP Check layer processes POLL call by transferring a call to all layers when the BIND is established to ANY_ADDRESS.

11. The device of claim 1, wherein the IP Check layer processes SHUTDOWN call by transferring a call to a layer having the assigned IP when BIND is established to a predetermined IP; and the IP Check layer processes SHUTDOWN call by transferring the SHUTDOWN call to all layers when the BIND is established to ANY_ADDRESS.

12. The device of claim 1, wherein the IP Check layer processes SETSOCKOPT call by transferring a call to a layer including the assigned IP when a current socket is bound to a predetermined IP address; and the IP Check layer processes SETSOCKOPT call by transferring the SETSOCKOPT call to all layers when the current socket is not bound to the predetermined IP address.

13. The device of claim 1, wherein the IP Check layer processes GETSOCKOPT call by transferring a call to a layer including the assigned IP when a current socket is bound to a predetermined IP; and the IP Check layer process GETSOCKOPT call by transferring the GETSOCKOPT call to the host INET layer when a current socket is not bound or bound to ANY_ADDRESS.

14. The device of claim 1, wherein the IP Check layer process RELEASE call by transferring the RELEASE call to all lower layers for releasing operations related to data and corresponding socket.

15. The device of claim 1, wherein the IP Check layer processes IOCTL call by transferring the IOCTL call to a corresponding layer when a socket called by the IOCTL is bound to the assigned IP address and CMD commands of the IOCTL call are FIOSETOWN or SIOCSPGRP; and the IP Check layer processes IOCTL call by transferring the IOCTL call to all layers when the socket called by the IOCTL is not bound or is bound to ANY_ADDRESS, and the CMD commands of the IOCTL call are FIOSETOWN or SIOCSPGRP.

16. The device of claim 1, wherein the IP Check layer processes IOCTL call by transferring the IOCTL call to a corresponding layer when a socket called by the IOCTL is bound to the assigned IP address and CMD commands of the IOCTL call are FIOGETOWN, SIOCGPGRP or SJOCGSTAMP; and the IP Check layer processes IOCTL call by transferring the IOCTL call to one of lower layers when the socket called by the IOCTL is not bound or is bound to ANY_ADDRESS, and the CMD commands of the IOCTL call are FIOGETOWN, SIOCGPGRP or SIOCGSTAMP.

17. The device of claim 1, wherein the IP Check layer processes IOCTL call by calling the IOCTL call for all layers because a routing table is maintained in all layers when CMD commands of the IOCTL call are SIOCADDRT, SIOCDELRT, SIOCRTMS, SIOCDARP, SIOCGARP, or SIOCSARP.

18. The device of claim 1, wherein the IP Check layer processes IOCTL call by not transferring to the call to lower layers and processing the call in the IP Check layer process when CMD commands of the IOCTL call are SIOCGIFADDR, SIOCGIFBRDADDR, or SIOCGIFNETMASK.

19. The device of claim 1, wherein the IP Check layer processes IOCTL call by transferring the IOCTL call to a layer including a network interface assigned by a user when CMD commands of the IOCTL call are SIOCSIFADDR, SIOCSIFBRDADDR, SIOCSIFNETMASK, SIOCSIFDSTADDR, SIOCSIFPFLAGS, SIOCGIFDIVERT, SIOCSIFDIVERT, SIOCADDDLCI, SIOCDELDLCI or DEFAULT.

20. The device of claim 1, wherein the IP Check layer processes IOCTL call by transferring the IOCTL call to the INET socket layer and processing the IOCTL call for a predetermined kernel module when CMD commands of the IOCLT call are SIOCGIFBR, SIOCSIFBR, SIOCGIFVLAN, or SIOCSIFVLAN.

* * * * *